(12) United States Patent
Tayebati

(10) Patent No.: US 6,819,466 B2
(45) Date of Patent: Nov. 16, 2004

(54) ASYMMETRIC FABRY-PEROT MODULATOR WITH A MICROMECHANICAL PHASE COMPENSATING CAVITY

(75) Inventor: Parviz Tayebati, Boston, MA (US)

(73) Assignee: Coretek Inc.

( * ) Notice: Subject to any disclaimer, the term of this patent is extended or adjusted under 35 U.S.C. 154(b) by 0 days.

(21) Appl. No.: 10/036,125

(22) Filed: Dec. 26, 2001

(65) Prior Publication Data

US 2003/0117681 A1 Jun. 26, 2003

(51) Int. Cl.[7] .............................. G02F 1/03; G02F 1/07
(52) U.S. Cl. ...................... 359/260; 359/247; 359/245; 372/26; 372/30; 372/99
(58) Field of Search ................................ 359/260, 247, 359/248, 249, 245, 290, 291, 223; 372/18, 19, 20, 25, 26, 30, 32, 50, 99

(56) References Cited

U.S. PATENT DOCUMENTS

| | | | | |
|---|---|---|---|---|
| 5,202,897 A | * | 4/1993 | Whitehead | 372/92 |
| 5,426,312 A | * | 6/1995 | Whitehead | 257/21 |
| 5,495,360 A | * | 2/1996 | Yoo | 359/248 |
| 5,510,914 A | * | 4/1996 | Liu et al. | 349/136 |
| 5,892,786 A | * | 4/1999 | Lott | 372/50 |
| 5,909,303 A | * | 6/1999 | Trezza et al. | 359/248 |
| 6,349,106 B1 | * | 2/2002 | Coldren | 372/50 |
| 2002/0191268 A1 | * | 12/2002 | Seeser et al. | 359/260 |

* cited by examiner

Primary Examiner—Ricky Mack
Assistant Examiner—Brandi Thomas
(74) Attorney, Agent, or Firm—Steubing McGuinness & Manaras LLP

(57) ABSTRACT

An asymmetric Fabry-Perot modulator is disclosed having an adjustable resonant cavity length. A preferred embodiment of the invention includes an asymmetric Fabry-Perot modulator having a first reflector adjustably mounted to another portion of the modulator containing a second reflector. The length of the resonant cavity is adjusted by microelectomechanically changing the distance from the first reflector to the second reflector. In turn, this change of the resonant cavity length may tune the modulator to an optimal wavelength corresponding to the electro-absorptance material in the modulator.

9 Claims, 2 Drawing Sheets

ASYMMETRIC FABRY-PEROT MODULATOR WITH A MICROMECHANICAL PHASE COMPENSATING CAVITY

FIELD OF THE INVENTION

This invention relates to the modulation of laser light and, more particularly, to Fabry-Perot modulators having a multiple quantum well modulator.

BACKGROUND OF THE INVENTION

Asymmetric Fabry-Perot modulators (AFPM) have been utilized in the prior art for modulating laser light. The AFPM modulates a constant amplitude light by modulating the electro-absorption of a semiconductor material within an optical cavity defined by top and bottom reflectors. The optical cavity consists of a multiple quantum well semiconductor structure referred to as the electro-absorption material. By modulating the electric field across the electro-absorption material, the optical absorption of the semiconductor material varies and by that, so does the total reflectivity of the cavity. Specifically, unmodulated constant amplitude light that is incident upon the top reflector is partially reflected away from the electro-absorption material and partially transmitted through the electro-absorption material. The transmitted part is reflected by the bottom reflector, transmitted again through the electro-absorption material, and recombined with the original part of the incident light that was reflected by the top reflector. When the absorption in the electro-absorption material is low, the reflection of the incident light is dominated by the bottom reflectance and the total reflection is high. When the electro-absorption within the material is increased by increasing the applied field, the total reflectivity starts to decrease. When the absorption in each direction in the cavity, A(v), equals ½ ($R_b$-$R_t$), (where $R_b$ is the reflectivity of the bottom reflector and $R_t$ is the reflectivity of the top reflector), a cavity matching condition is achieved and the total reflectivity, $R_{total}$, equals zero.

Varying the electro-absorption between low (essentially zero) reflectivity at the matching condition-voltage and high reflectivity at low or zero voltage across the cavity therefore causes the magnitude of the reflect signal to be modulated in accordance with the modulating electronic field. When the top and bottom reflectivities and the absorption within the electro-absorption material are ideally chosen, the ratio between the amplitude of a "1" and a "0" pulse (referred to as the extinction or contrast ratio) is sufficiently large to ensure detection outside the AFPM.

Asymmetric Fabry-Perot modulators have been utilized in the prior art with a multiple quantum well (MQW) defined by a front reflector and a back reflector having a fixed cavity length L. The cavity length is chosen such that resonance occurs close to the long wavelength side of the unbiased MQW absorption edge so that application of a bias signal to the MQW causes the reflectivity of the fixed length cavity to become close to zero. Whitehead uses this arrangement to provide a high contrast modulator less sensitive to temperature variations and deviations from ideal reflectivities of the front and back reflectors than high-finesse Fabry-Perot modulators.

These AFPMs have reflecting cavities of a fixed length construction. As such, the parameters of the devices must be chosen carefully and must be fabricated with precision. This precise fabrication is necessary in order to match the optimal cavity length, cavity reflectivities and electro-absorption material with one another. These factors must also be maintained over the life of the AFPM devices. In addition, temperature variations may also alter the performance of AFPM devices.

SUMMARY OF THE INVENTION

As a result, one object of the present invention is to provide a novel asymmetric Fabry-Perot modulator having an adjustable cavity length, whereby the device may be tuned to a precise, absolute wavelength independent of an applied voltage across the electro-absorptive layer of the modulator.

Another object of the present invention is to provide a novel method for tuning an asymmetric Fabry-Perot modulator having an adjustable cavity length, whereby the device is tuned to an absolute wavelength independent of an applied voltage across the electro-optive layer of the modulator, and for thereafter keeping the cavity length tuned to that wavelength.

These and other objects are addressed by the present invention.

In one form of the invention, there is provided an asymmetric Fabry-Perot modulator having an adjustable cavity length for use in tuning the modulator length to a precise, absolute wavelength independent of an applied voltage across the electro-absorptive layer of the modulator, the modulator comprising first and second reflectors forming a resonant cavity therebetween; electro-absorption material disposed between the first reflector and second reflector, the absorption of the electro-absorption material being varied in response to an external modulating signal; and means for adjusting the length of said resonant cavity formed between the first reflector and the second reflector, the cavity length adjustment means include changing the position of the first reflector relative to the second reflector, wherein the magnitude of light output from said first reflector is determined by the reflectivity of the first reflector, the absorption in the electro-absorption material and the length of the resonant cavity as defined by the cavity length mirror adjustment means.

In another form of the invention, there is provided a method for tuning an asymmetric Fabry-Perot modulator, the method comprising the steps of: (1) reflecting laser light between a first reflector and a second reflector forming a resonating cavity therebetween; (2) positioning the first reflector to change the length of the resonant cavity to an optimal wavelength as defined by the properties of electro-absorption material contained in the modulator; and (3) monitoring the output of the first reflector as the resonant cavity length is tuned whereby to tune the Fabry-Perot modulator to the desired wavelength.

BRIEF DESCRIPTION OF THE DRAWINGS

These and other objects and features of the present invention will be more fully disclosed by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 1:
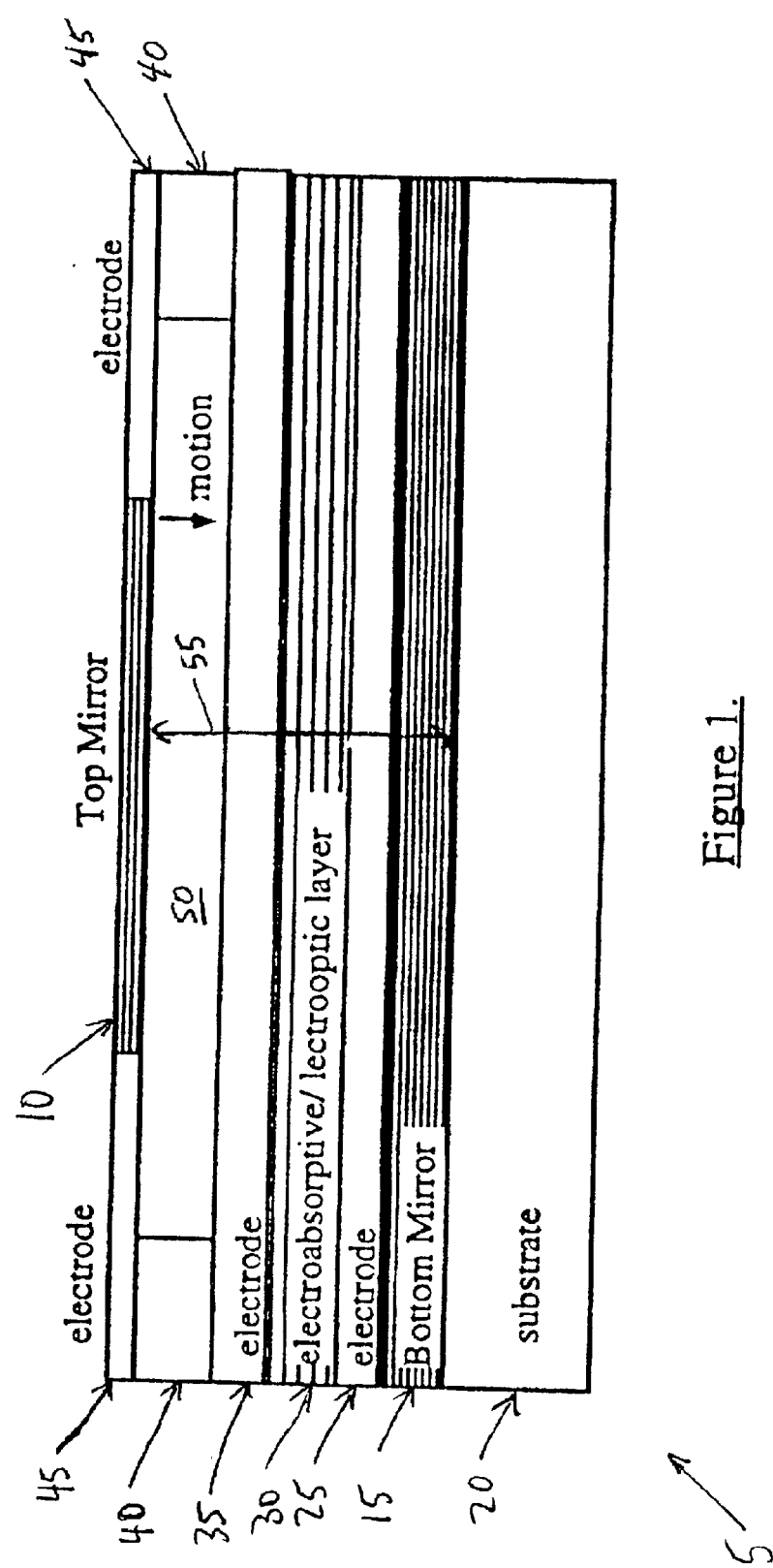
FIG. 1 is a schematic side view of an asymmetric Fabry-Perot modulator having an adjustable resonant cavity, wherein the adjustable resonant cavity as shown includes a reflector of a trampoline construction.
Figure 2:
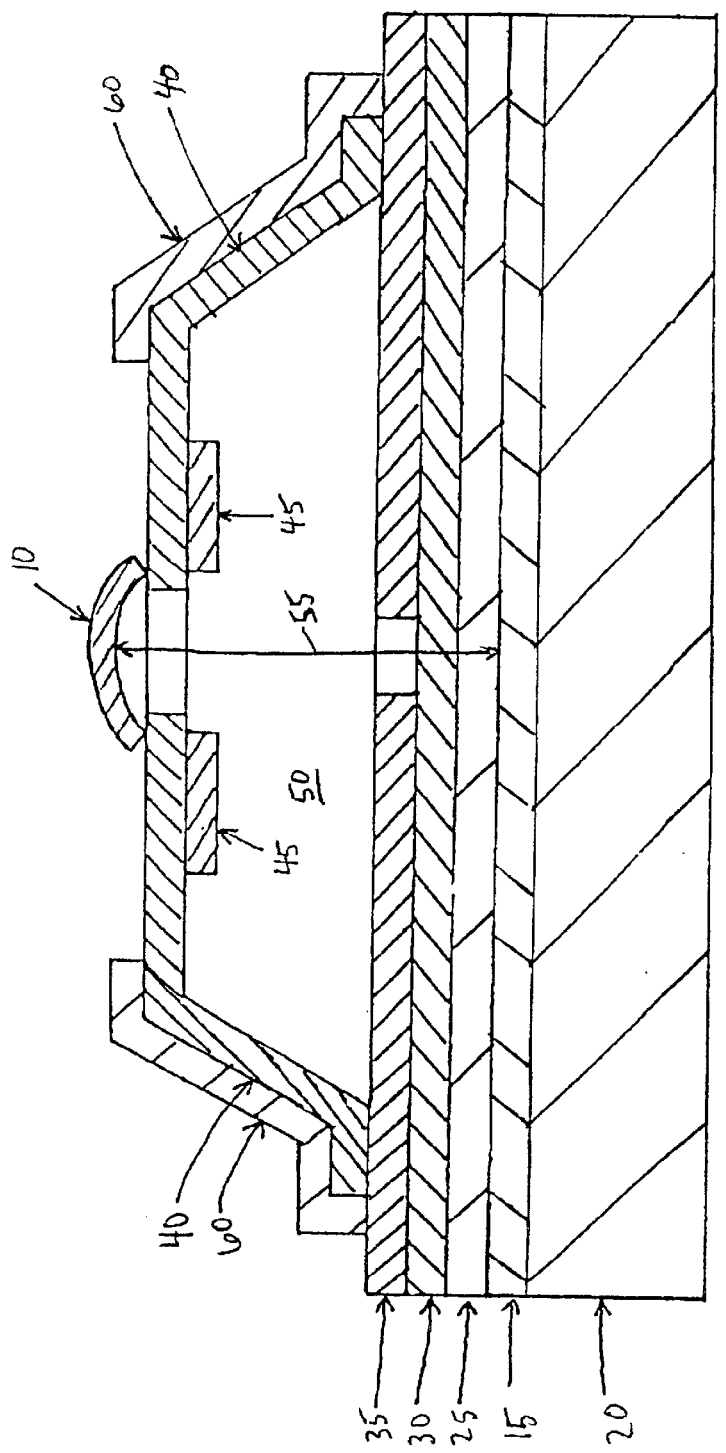
FIG. 2 is a schematic side view of an asymmetric Fabry-Perot modulator having an adjustable resonant cavity, wherein the adjustable resonant cavity as shown includes a reflector of a cantilever construction.

Referring to FIGS. 1 and 2, there is shown an asymmetric Fabry-Perot modulator 5 having a first reflector (top mirror) 10 and a second reflector (bottom mirror) 15. First reflector 10 is contained in one portion of modulator 5 and is adjustably mounted to another portion of modulator 5 containing second reflector 10.

More particularly, in a preferred embodiment, asymmetric Fabry-Perot modulator 5 typically comprises a substrate 20, a second reflector 15 mounted to the top of substrate 20, a first electro-absorptive electrode 25 mounted to the top of second reflector 15, electro-absorption material 30 mounted to the top of second reflector 15, a second electro-absorption material electrode 35 mounted to the top of electro-absorption material 30, a support 40 atop second electro-absorption electrode 35, a reflector electrode 45 fixed to support 40, an air gap 50 between second electro-absorption material electrode 35 and reflector electrode 45, and first reflector 10 set atop support 40.

As a result of this construction, a Fabry-Perot filter, or a micromechanical phase compensating resonant cavity 55, is effectively created between first reflector 10 and second reflector 15. Furthermore, by applying an appropriate voltage across second electro-absorption material electrode 35 and first reflector electrode 45, the position of first reflector 10 can be changed relative to second reflector 15, whereby to change the length of resonant cavity 55 formed between first reflector 10 and second reflector 15, and hence tune asymmetric Fabry-Perot modulator 5.

Referring again to FIG. 1, in a preferred embodiment of the invention, asymmetric Fabry-Perot modulator 5 includes microelectromechanical phase compensating resonant cavity 55 having first reflector 10 of a trampoline platform construction. In pending prior U.S. patent application Ser. No. 09/059,877, filed Apr. 14, 1998 by Parviz Tayebati for AN ELECTRICALLY TUNABLE FABRY-PEROT STRUCTURE UTILIZING A DEFORMABLE MULTI-LAYER MIRROR AND METHOD OF MAKING THE SAME, which patent application is hereby incorporated herein by reference, there is disclosed reflectors using a trampoline platform construction for use with Fabry-Perot structures.

Referring again to FIG. 2, in another preferred embodiment of the present invention, asymmetric Fabry-Perot modulator 5 includes microelectromechanical phase compensating resonant cavity 55 having first reflector of a cantilever construction. Support 25 may additionally include a reinforcer 60 as shown in FIG. 2. In pending prior U.S. patent application Ser. No. 09/636,806, filed Aug. 10, 2000 by Parviz Tayebati et al. for OPTICAL FIBER WAVELENGTH REFERENCE DEVICE, which patent application is hereby incorporated by reference, there is disclosed a cantilever construction for use with Fabry-Perot structures.

ADVANTAGES OF THE INVENTION

Numerous advantages are achieved through the use of the present invention. For one thing, effective reflection cancellation is provided regardless of the electro-absorption material and the corresponding initial cavity structure usually required due to the adjustable resonant cavity length of the present invention.

In addition, effective temperature compensation is also provided due to the adjustable resonant cavity length of the present invention.

MODIFICATIONS

It is to be understood that the present invention is by no means limited to the particular constructions and method steps disclosed above and/or shown in the drawings, but also comprises any modifications or equivalents within the scope of the claims.

What is claimed is:

1. An asymmetric Fabry-Perot modulator, comprising:
   a first reflector and a second reflector in said asymmetric Fabry-Perot modulator fanning a resonant cavity therebetween;
   electro-absorption material disposed between said first reflector and said second reflector, the absorption of said electro-absorption material being varied in response to an external modulating signal;
   a pair of electrodes dispose between the first reflector and the second reflector:
   said first reflector being fixedly mounted to a substrate; and
   said second reflector being movably mounted to said substrate so as to selectively adjust said resonant cavity formed between said first reflector and said second reflector from a given length to another given length by changing the position of said second reflector relative to said first reflector, wherein the movement of said second reflector is controlled in response to a voltage applied across the pair of electrodes and wherein the magnitude of light output from said first reflector is determined by the reflectivity of said first reflector, the reflectivity of said second reflector, the absorption in said electro-absorption material and the length of said resonant cavity as defined by said second reflector being movably mounted to said substrate.

2. A method for tuning an asymmetric Fabry-Perot modulator, comprising:
   reflecting laser light between a first reflector and a second reflector in said asymmetric Fabry-Perot modulator, said first reflector and said second reflector forming a resonating cavity therebetween, said resonating cavity having a given length between said first reflector and said second reflector;
   a pair of electrodes disposed between the first reflector and the second reflector;
   adjusting said first reflector by application of a voltage across the pair of electrodes to change said given length of said resonating cavity so as to produce an optimal wavelength as defined by the properties of electro-absorption material contained in said modulator; and
   monitoring the output of said first reflector as said resonating cavity is tuned to another given length so as to tune said asymmetric Fabry-Perot modulator to the optimal wavelength.

3. A method for tuning an asymmetric Fabry-Perot modulator, comprising:
   reflecting laser light between a first reflector and a second reflector in said asymmetric Fabry-Perot modulator, said first reflector and said second reflector forming a resonating cavity therebetween, and said resonating cavity being selectively adjustable front a given length to another given length between said first reflector and said second reflector, respectively;
   applying an external modulating signal to electro-absorption material disposed between said first reflector and said second reflector, the absorption of said electro-absorption material being varied in response to said external modulating signal; and adjusting said resonant cavity formed between said first reflector and said second reflector from said given length to said another given length by applying a voltage across a pair of electrodes disposed between the first reflector and the second reflector wherein the magnitude of light output from said first reflector is determined by the reflectivity of said first reflector, the reflectivity of said second reflector the absorption of said electro-absorption material and said another given length of said resonant cavity as defined by said another given length of the resonant cavity selectively adjustable between said first reflector and said second reflector adjustable between said first reflector and said second reflector.

4. The method of claim 3 further comprising the method step of monitoring the magnitude of said light output from said first reflector.

5. The method of claim 4 further comprising the method step of adjusting said resonant cavity from said given length to said another given length based upon said monitored light output so as to tune said asymmetric Fabry-Perot modulator to die optimal wavelength.

6. A method for tuning a laser, comprising:

providing an asymmetric Fabry-Perot modulator, said modulator comprising:

a first reflector and a second reflector in said asymmetric Fabry-Perot modulator forming a resonant cavity therebetween, electro-absorption material disposed between said first reflector and said second reflector, the absorption of said electro-absorption material being varied in response to an external modulating signal;

a pair of electrodes disposed between the first reflector and the second reflector;

said second reflector being movably mounted to said substrate in response to an application of a voltage across the pair of electrodes so as -to selectively adjust said resonant cavity formed between said first reflector and said second reflector from a given length to another given length by changing the position of said first reflector relative to said second reflector, wherein the magnitude of light output from said first reflector is determined by the reflectivity of said first reflector, the reflectivity of said second reflector, the absorption in said electro-absorption material and the length of said resonant cavity as defined by said another given length of the resonant cavity selectively adjustable between said first reflector and said second reflector;

applying said external modulating signal to said electro-absorption material;

monitoring said magnitude of light output from said first reflector; and adjusting said resonant cavity from said given length to said another given length based upon said monitored light output by varying the voltage applied across the pair of electrodes so as to tune said asymmetric Fabry-Perot modulator to an optimal wavelength.

7. The method of claim 6 wherein said external modulating signal is a voltage.

8. The method of claim 7 wherein said voltage is constant.

9. The method of claim 7 wherein said voltage is varied over a period of time.

* * * * *